United States Patent
Hashimoto et al.

(10) Patent No.: US 8,384,804 B2
(45) Date of Patent: Feb. 26, 2013

(54) IMAGING APPARATUS FOR PROCESSING NOISE SIGNAL AND PHOTOELECTRIC CONVERSION SIGNAL

(75) Inventors: Seiji Hashimoto, Yokohama (JP); Hidetoshi Hayashi, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 298 days.

(21) Appl. No.: 12/708,262

(22) Filed: Feb. 18, 2010

(65) Prior Publication Data

US 2010/0141790 A1    Jun. 10, 2010

Related U.S. Application Data

(63) Continuation of application No. 11/015,240, filed on Dec. 17, 2004, now Pat. No. 7,692,704.

(30) Foreign Application Priority Data

Dec. 25, 2003   (JP) .................................. 2003-430427

(51) Int. Cl.
    *H04N 5/217*   (2011.01)
(52) U.S. Cl. ........................................................ 348/241
(58) Field of Classification Search .......... 348/241–243, 348/294–324
    See application file for complete search history.

(56) References Cited

U.S. PATENT DOCUMENTS

| | | | |
|---|---|---|---|
| 5,371,470 A | 12/1994 | Jeng | |
| 6,037,577 A | 3/2000 | Tanaka et al. | |
| 7,324,144 B1 * | 1/2008 | Koizumi | 348/294 |

FOREIGN PATENT DOCUMENTS

| | | | |
|---|---|---|---|
| JP | 63-086976 A | 4/1988 | |
| JP | 10-257389 A | 9/1998 | |
| JP | 2003-037780 A | 2/2003 | |
| JP | 2003-204487 A | 7/2003 | |

OTHER PUBLICATIONS

Dickinson, et al. Standard CMOS Active Pixel Image Sensors for Multimedia Applications, IEEE, US, 1995.

* cited by examiner

*Primary Examiner* — Chieh M Fan
*Assistant Examiner* — Akshay Trehan
(74) *Attorney, Agent, or Firm* — Canon USA Inc. IP Division

(57) ABSTRACT

An imaging apparatus includes a pixel unit having a photoelectric conversion section and an amplifying device for amplifying a signal from the photoelectric conversion section and outputting the signal, a reading unit having a first mode in which a signal obtained by resetting an input section of the amplifying device is sampled a plurality of times via the amplifying device and a second mode in which a photoelectric conversion signal generated in the photoelectric conversion section is sampled a plurality of times via the amplifying device; a mixing unit for generating a first mixing signal by mixing the signals that are sampled in the first mode, outputting the first mixing signal, generating a second mixing signal by mixing the signals that are sampled in the second mode, and outputting the second mixing signal; and a difference processing unit for performing difference processing between the first mixing signal and the second mixing signal.

1 Claim, 14 Drawing Sheets

FIG. 14

|  | n | n+1 | n+2 | n+3 | n+4 | n+5 | n+6 | n+7 |
|---|---|---|---|---|---|---|---|---|
| m | R | G | R | G | R | G | R | G |
| m+1 | G | B | G | B | G | B | G | B |
| m+2 | R | G | R | G | R | G | R | G |
| m+3 | G | B | G | B | G | B | G | B |
| m+4 | R | G | R | G | R | G | R | G |
| m+5 | G | B | G | B | G | B | G | B |
| m+6 | R | G | R | G | R | G | R | G |
| m+7 | G | B | G | B | G | B | G | B |

FIG. 15A

|   | j | j+1 | j+2 | j+3 | j+4 | j+5 |
|---|---|-----|-----|-----|-----|-----|
| i | R | G | R | G | R | G |
| i+1 | G | B | G | B | G | B |
| i+2 | R | G | R | G | R | G |
| i+3 | G | B | G | B | G | B |
| i+4 | R | G | R | G | R | G |
| i+5 | G | B | G | B | G | B |

FIG. 15B

|   | n | n+1 | n+2 | n+3 | n+4 | n+5 |
|---|---|-----|-----|-----|-----|-----|
| m | R |   | R |   | R |   |
| m+1 |   |   |   |   |   |   |
| m+2 | R |   | R |   | R |   |
| m+3 |   |   |   |   |   |   |
| m+4 | R |   | R |   | R |   |
| m+5 |   |   |   |   |   |   |

|   | n+3 | n+4 | n+5 | n+6 | n+7 |
|---|-----|-----|-----|-----|-----|
| m | G |   | G |   | G |
| m+1 |   |   |   |   |   |
| m+2 | G |   | G |   | G |
| m+3 |   |   |   |   |   |
| m+4 | G |   | G |   | G |
| m+5 |   |   |   |   |   |

|   | n | n+1 | n+2 | n+3 | n+4 | n+5 |
|---|---|-----|-----|-----|-----|-----|
| m+3 | G |   | G |   | G |   |
| m+4 |   |   |   |   |   |   |
| m+5 | G |   | G |   | G |   |
| m+6 |   |   |   |   |   |   |
| m+7 | G |   | G |   | G |   |

|   | n+3 | n+4 | n+5 | n+6 | n+7 |
|---|-----|-----|-----|-----|-----|
| m+3 | B |   | B |   | B |
| m+4 |   |   |   |   |   |
| m+5 | B |   | B |   | B |
| m+6 |   |   |   |   |   |
| m+7 | B |   | B |   | B |

$B_{i+1j} = B_{m+3,n+3} + B_{m+3,n+5} + B_{m+3,n+7}$
$+ B_{m+5,n+3} + B_{m+5,n+5} + B_{m+5,n+7}$
$+ B_{m+7,n+3} + B_{m+7,n+5} + B_{m+7,n+7}$

IMAGING APPARATUS FOR PROCESSING NOISE SIGNAL AND PHOTOELECTRIC CONVERSION SIGNAL

CROSS REFERENCE OF RELATED APPLICATIONS

This application is a continuation of U.S. patent application Ser. No. 11/015,240 filed on Dec. 17, 2004 which claims priority from Japanese Patent Application No. 2003-430427 filed Dec. 25, 2003, the entire contents of both of which are hereby incorporated by reference herein.

BACKGROUND OF THE INVENTION

1. Field of the Invention

The present invention relates to an imaging apparatus for capturing a subject image.

2. Description of the Related Art

In recent years, digital still cameras that are mainly used for capturing still images and imaging devices having a maximum number of 10,000,000 pixels have come into use, and even for movie cameras, whose main application is to capture moving images, imaging devices of several million pixels have come into use.

It is clear that such increases in the number of pixels of imaging devices is attributable to the shrinking of the pixel size. However, as a result, the aperture area of the pixel also becomes smaller, and a low sensitivity and light shot noise become noticeable problems. Furthermore, as the number of electrons involved decreases, noise resulting from the imaging device become conspicuous.

As a method of reducing noise of an amplifying imaging device, it is common practice that, in order to remove reset noise at the input stage of an amplifying transistor, which appears as fixed pattern noise on the image capturing-plane and Vth variations of a transistor forming the amplifier, the noise is read in advance, and thereafter, a photoelectric conversion signal is superposed on the noise and read, and noise processing is performed by subtracting them, that is, so-called (S−N) processing is performed. In this method, it is recognized as common knowledge that fixed pattern noise can be reduced, but random noise becomes $\sqrt{2}$ times as great.

A conventional example in which such random noise is reduced is described below.

(1) As disclosed in U.S. Pat. No. 5,943,094, in the pixel noise reduction process, based on capturing output obtained in a light shielding state, predetermined noise data is generated from a plurality of pieces of noise data. For the captured data, data at one time after AD conversion after an image-capturing operation is performed is used. Since the predetermined noise data is averaged, the random noise is reduced. However, the random noise contained in the image-captured data cannot be reduced. Furthermore, some time for reading noise from the imaging device is required, the image-capturing interval becomes long, and image capturing cannot be performed immediately. Furthermore, the reactive power consumption becomes larger.

(2) As disclosed in U.S. Patent Publication 20020191742, in order to reduce X-ray noise, the photo-converted signal is read a plurality of times, and based on the difference, the X-ray noise is separated. In this case, random X-ray noise can be separated, but the pixel noise increases.

(3) As disclosed in U.S. Pat. No. 6,037,577, a method of reducing the influence of noise generated by a signal processing circuit at the subsequent stage by reading noise or a signal from an amplifying transistor a plurality of times and by increasing the noise and the signal amplitude by performing charge addition has been proposed. In, for example, FIG. 2 of the embodiment, charge addition is difficult in the case where, merely, a signal is electrically supplied to the capacitor after passing through a conventional MOS switch. When a charge-transfer MOS transistor is used, since the transfer of the signal requires a sufficient time, high-speed driving and high-speed continuous image capturing are difficult, and the possibility that 1/f noise of the amplifying transistor cannot be reduced is high.

(4) As disclosed in Japanese Patent Laid Open No. 2001-36920, a method of reducing noise in a reading-system signal processing circuit is known. In this case, in a method of reducing noise from the amplifying transistor, noise of the signal processing circuit at the subsequent stage can be ignored by a CDS (correlated double sampler) circuit and amplifier, which is effective in reducing the fixed pattern noise of the amplifying transistor.

In the foregoing, the conventional example is described with a view to reducing noise of the imaging device. In the applications of an imaging device having a large number of pixels, it is common practice that image-capturing is performed with a large number of pixels in high-precision image-capturing requiring a high resolution, and image-capturing is performed with a small number of pixels in a case in which a low resolution is sufficient. At that time, in the high-precision image-capturing, almost all of the pixel signals are read from the imaging device. In the low-resolution image capturing, for preventing battery consumption of the camera or for capturing moving images, pixel signals are read while being thinned out, or pixel signals are read while being thinned out and added.

In a first example of the above-described technology, as disclosed in U.S. Pat. No. 6,124,888, reading addition is performed by thinning out the pixels of the same color in units of 4×4 pixels. In a second example, disclosed in Japanese Patent Laid-Open No.2001-36920, by using 4×4 pixels as one group, a plurality of pixel signals are added so that the spatial color arrangement of each color before addition and the spatial color arrangement of each color after addition become the same.

In the publicly known example of noise reduction of the conventional amplifying imaging device, the fixed pattern noise caused by the amplifying transistor can be reduced to an image level at which no problem is posed in the (S−N) processing. As a result, 1/f noise (including random noise), which occurs when the amplifying transistor is driven, has become a problem. Or, it may be said that, finally, a technology level has been reached where the 1/f noise of the amplifying transistor after the S−N processing becomes a problem. This noise of the amplifying imaging device is less than or equal to that of a CCD in the high-precision image-capturing mode. However, in the addition reading of signals inside the imaging device, it has become a new problem. This is due to the following reasons. Since pixel addition in the CCD is charge addition, the signal is amplified as a result of the addition of the photoelectric conversion signals from a plurality of pixels. However, since the noise is determined by the amplifier (floating diffusion amplifier) at the final stage of the CCD, this case is the same as addition. However, in the amplifying imaging device, since a signal containing the noise for each pixel is added, noise becomes larger. It may be said that, when compared to the CCD, the amplifying imaging device has a poor SN ratio during dark time by $\sqrt{n}$ times as large as the number of addition pixels. The 1/f noise of the amplifying transistor remains a significant problem.

Next, the problems of the method of adding a plurality of pixel signals are described.

In the above-described first example, the problem is that the number of effective pixels used from among the 4×4 pixels is small. In recent imaging devices, as a result of the imaging device having a larger number of pixels, the pixel unit size becomes smaller, and insufficient sensitivity has become a more significant problem. In the digital still camera, when a dark subject is captured, insufficient sensitivity can be compensated for by strobe light-emission, but during moving-image capturing, an expensive and heavy light source cannot be used, and significant noise occurs. As a result of thinning-out of the pixel signals, moire fringing due to a decrease in the sampling frequency occurs, and the deterioration of the image quality is severe.

In the above-described second example, the number of additions of the pixel signals within one group is increased, and sensitivity is improved. However, the problem is that pixel signals that are not used (discarded pixel signals) exist. A plurality of pixel signals are added so that the spatial color arrangement of each color becomes the same before and after addition within one group. However, another problem is that moire fringing occurs when the captured image is expanded.

As described above, in the conventional technology, since the pixel signals are thinned out, the sensitivity is not improved sufficiently, and moire fringing occurs even though the spatial color arrangement is identical.

SUMMARY OF THE INVENTION

The present invention reduces noise and improves the quality of an image.

According to an aspect of the present invention, an imaging apparatus includes: at least one pixel unit having a photoelectric conversion section and an amplifying device for amplifying a signal from the photoelectric conversion section, the amplifying device outputting a signal of a first signal type in a condition which an input section of the amplifying device is reset and outputting a signal of a second signal type in a condition that is amplified from the photoelectric conversion section; at least one storage unit having a plurality of storage sections, each storage section storing one signal of the first signal type or one signal of the second signal type, and having a first mode in which at least two signals of the first signal type obtained at different times are stored in at least two of the storage sections and a second mode in which at least two signals of the second signal type obtained at different times are stored in at least two of the storage sections; at least one mixing unit for generating a first mixing signal by mixing the at least two signals of the first signal type stored in the first mode, outputting the first mixing signal, generating a second mixing signal by mixing the at least two signals of the second signal type stored in the second mode, and outputting the second mixing signal; and at least one difference processing unit for performing difference processing between the first mixing signal and the second mixing signal.

According to another aspect of the present invention, an imaging apparatus includes: a pixel unit having a photoelectric conversion section and an amplifying device for amplifying a signal from the photoelectric conversion section and outputting the signal; a reading unit having a first mode in which a signal obtained by resetting an input section of the amplifying device is sampled a plurality of times via the amplifying device and a second mode in which a photoelectric conversion signal that is generated in the photoelectric conversion section is sampled a plurality of times via the amplifying device; a mixing unit for generating a first mixing signal by mixing the signals that are sampled a plurality of times in the first mode, outputting the first mixing signal, generating a second mixing signal by mixing the signals that are sampled a plurality of times in the second mode, and outputting the second mixing signal; and a difference processing unit for performing difference processing between the first mixing signal and the second mixing signal.

Further features and advantages of the present invention will become apparent from the following description of exemplary embodiments with reference to the attached drawings.

BRIEF DESCRIPTION OF THE DRAWINGS

FIG. 14 shows the color arrangement after a plurality of pixel signal are added.

FIG. 15 is an arrangement diagram of each color.

DESCRIPTION OF THE EMBODIMENTS

Figure 1:
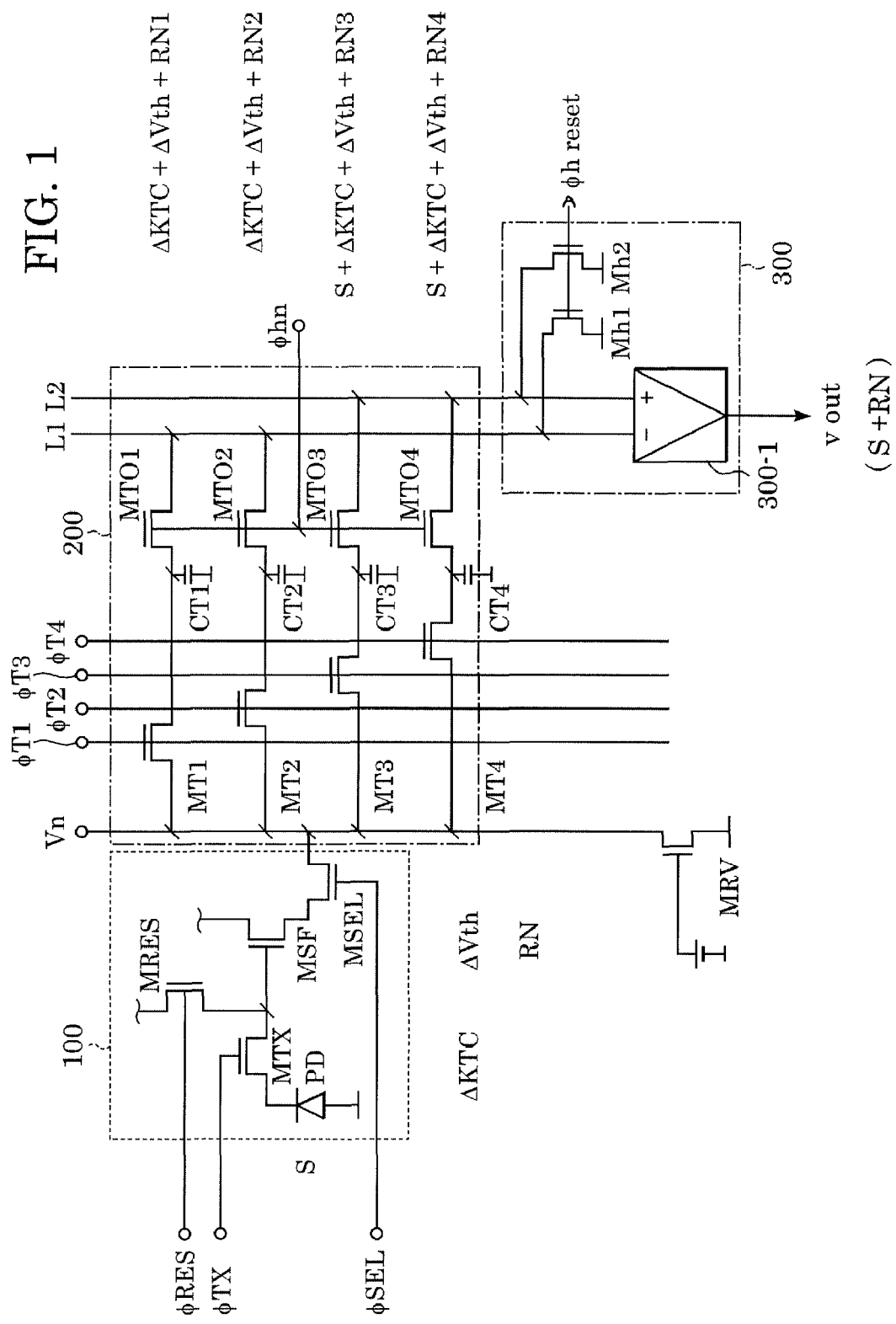
FIG. 1 is an addition averaging processing circuit diagram using a temporary storage memory of a color imaging apparatus according to a first embodiment of the present invention.

Exemplary embodiments of the present invention are described below. The circuit configuration and the operation in which the addition averaging of a plurality of pixel signals and plural readings of noise and a signal are used in combination are described more fully below with reference to the exemplary embodiments.

FIG. 14 is an illustration showing the color arrangement and the addition signal for each color after pixel signals are added by the color imaging apparatus according to the embodiments described below. FIG. 15A is an arrangement example view for each color before the pixel signals are added.

Initially, in the color arrangement example in FIG. 15A, it is assumed that color filters G (green), R (red), and B (blue) are formed in each photodiode of the imaging device. In this example, G is arranged in a checkered pattern, and R and B are arranged in a line-sequence form, in other words, 2×2=4 pixels of R, G, G, and B are arranged in two dimensions as one unit-pixel color arrangement.

In the addition reading image-capturing mode for pixel signals, as shown in FIG. 14, the pixel signals are added within the imaging device so that the color arrangement that is the same as that of FIG. 15A is formed, the signals are stored, and thereafter, they are read from the imaging device. FIGS. 15A to 15E are concerned with an example of an addition of 3×3=9 pixels of the same color. FIG. 15B shows an addition of $R_i$ and $R_j$ signal, in which the signals of the Rn-th column, the (Rn+2)th column, and the (Rn+4)th column of the m-th row, the (m+2)th row, and the (m+4)th row are added. Similarly, FIG. 15C shows an addition of $G_i$ and $G_{j+1}$ signals, FIG. 15D shows an addition of $G_{i+1}$ and $G_j$ signals, and FIG. 15E shows an addition of $B_{i+1}$ and $B_j$ signals. In this case, the colors are added in an overlapping manner in terms of space. As a result, the center of gravity of the spatial sampling between the added color signals becomes at an equal pitch, and all of the pixel signals are used. Therefore, moire fringing of the image due to the deviation of the spatial sampling disappears, and the sensitivity (in particular, the light shot noise) are improved by $\sqrt{9}=3$ times larger. For example, if the present invention is applied to an imaging device having five million pixels, the number of pixels becomes approximately a number corresponding to VGA after addition, and a reading of a high-speed image capturing at a high sensitivity becomes possible. Furthermore, if a low resolution is necessary, the number of addition pixels may be increased, for example, as 5×5 or 7×7. Consequently, there is the advantage that a higher sensitivity is obtained. In order to increase the number of addition pixels, the memory of the addition circuit (to be described later) needs only to be increased by an amount corresponding to the number of the addition rows.

Configurations and operations of several exemplary embodiments are described next.

First Embodiment

FIGS. 1, 3, 5, and 7 are schematic views in which a noise reduction circuit connected to a pixel unit within a memory sensor and a vertical signal line are extracted. Originally, the pixel unit is a memory sensor in which a plurality of pixel units are arranged in the horizontal and vertical directions and the noise reduction circuit is connected to the vertical signal line.

FIG. 1 is a circuit diagram of an addition averaging process of an imaging device for noise N and a signal S' using a temporary storage memory.

In FIG. 1, a block 100 surrounded by dotted lines is a pixel unit, a block 200 is a temporary storage memory, which temporarily stores signals from the pixel unit 100, and a block 300 is a (S−N) difference circuit.

Pixel noise N (reset noise ΔKTC, ΔVth, and RN (1/f noise), omitted in the following description), which is read a plurality of times from the pixel unit 100, and a signal S' (new noise RN' (1/f noise) and a photoelectric conversion signal S are superposed on the reset noise ΔVth, omitted in the following description) are stored in the corresponding temporary storage memories 200, are transferred simultaneously to horizontal signal lines L1 and L2, and are added and averaged individually. In this embodiment, since the noise and the signal are each read two times, RN of the amplifying transistor becomes $1/\sqrt{2}$. Then, difference processing of ΔVth and the reset noise ΔKTC, which are components of the noise N, is performed by the (S−N) difference circuit 300, and the noise contained in an output signal Vout becomes RN. In this manner, as a result of reading pixel noise and the signal two times each and performing addition averaging thereon, RN, which is made $\sqrt{2}$ times larger by the S−N circuit, becomes $1/\sqrt{2}$. At the initial stage, the time dependence when 1/f noise is read a plurality of times is of concern, but, even when the number n of readings was increased experimentally, the RN noise became approximately $1/\sqrt{n}$ times its initial level. In FIG. 1, reference letter PD denotes a photodiode within the block 100. Reference letter MSF denotes an amplifying transistor which amplifies light charge. Reference letter MTX denotes a transfer transistor for transferring light charge that is photoelectrically converted by the photodiode PD to the amplifying transistor MSF. Reference letter MSEL denotes a selection transistor for selecting the amplifying transistor MSF. Reference letter MRES denotes a transistor for removing the remaining charge in the input section of the amplifying transistor MSF. In the above-described pixel unit, resetting, storage, transfer, and reading control are performed in accordance with each pulse connected to the gate thereof, that is, φTX, φRES, and φSEL.

In the temporary memory storage block 200, reference letter Vn denotes a vertical signal line connected to the amplifying transistor MSF, and reference letter MRV denotes a transistor for the electrical current source of the amplifying transistor MSF. Reference letters CT1 and CT2 each denote a capacitor for temporarily storing pixel noise. Reference letters CT3 and CT4 each denote a capacitor for temporarily storing a pixel signal. Input transistors MT1 to MT4 to capacitors CT1 to CT4, respectively, are each a transfer transistor for controlling the transfer of noise and signals from the amplifying transistor MSF. Output transistors MTO1 to MTO4 from capacitors CT1 to CT4, respectively, are each a transistor for transferring noise and a signal to horizontal signal lines L1 and L2. The transfer of the transfer transistor is controlled in accordance with the pulses φT1 to φT4, and φhn. Here, φhn is a pulse from the horizontal scanning circuit (not shown in the figure).

Finally, the difference circuit block 300 is described next. Reference letters Mh1 and Mh2 each denote a reset transistor for resetting a remaining signal of the horizontal signal line. Reference numeral 300-1 denotes a differential amplifier for noise N and the signal S'.

Figure 2:
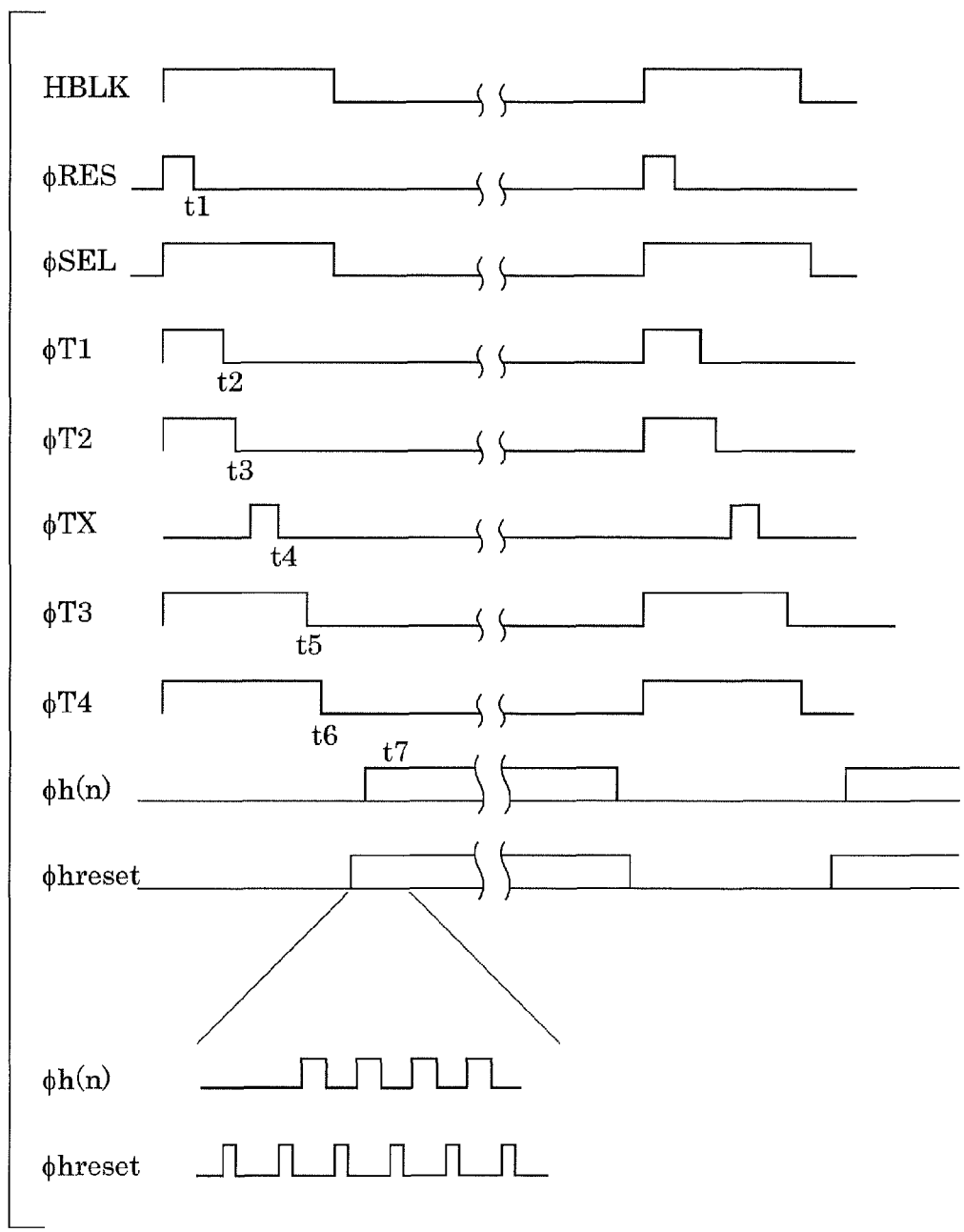
FIG. 2 is a timing chart of the first embodiment of the present invention.

The operation timing of the circuit of FIG. 1 is described next. FIG. 2 shows a timing chart of the main operation.

The remaining charge of the input gate section of the amplifying transistor is reset in the t1 period of the pulse φRES.

In the period t2 (at a timing of the edge) of the pulse φT1, the pixel noise N1 (ΔKTC+ΔVth+RN1) is stored in the capacitor CT1. In the period t3 (at a timing of the edge) of the pulse ΦT2, the pixel noise N2 (ΔKTC+ΔVth+RN2) is stored in the capacitor CT2. Next, in the period t4 of the pulse φTX, the light charge S that is photoelectrically converted by the photodiode PD is transferred to the input section of the amplifying transistor MSF. Then, in the period t5 (at a timing of the edge) of the pulse φT3, the signal S' (S+φKTC+ΔVth+RN3) is stored in the capacitor CT3, and in the period t6 (at a timing of the edge) of the pulse φT4, the signal S' (S+ΔKTC+ΔVth+RN4) is stored in the capacitor CT4. This follows that each of the noise and the signal are stored two times (t2 and t3, t5 and t6) from the amplifying transistor MSF. These operations are performed for each of a plurality of the pixel rows which are connected in the horizontal direction in the actual area sensor. The noise and the signal of the memory are simultaneously transferred to the horizontal signal lines L1 and L2 in accordance with the pulse φh (n) from the horizontal scanning circuit, and become the added and averaged noise (ΔKTC+ΔVth+RN'/$\sqrt{2}$) and signal (S+ΔKTC+ΔVth+RN''/$\sqrt{2}$). Then, the fixed pattern noise is removed by the differential process by the differential amplifier 300-1, and a signal Vout (S+RN) is output. ϕOhreset is used to reset the remaining charge of the horizontal signal line so as to be in preparation for the next transfer of the noise and the signal.

Second Embodiment

Figure 3:
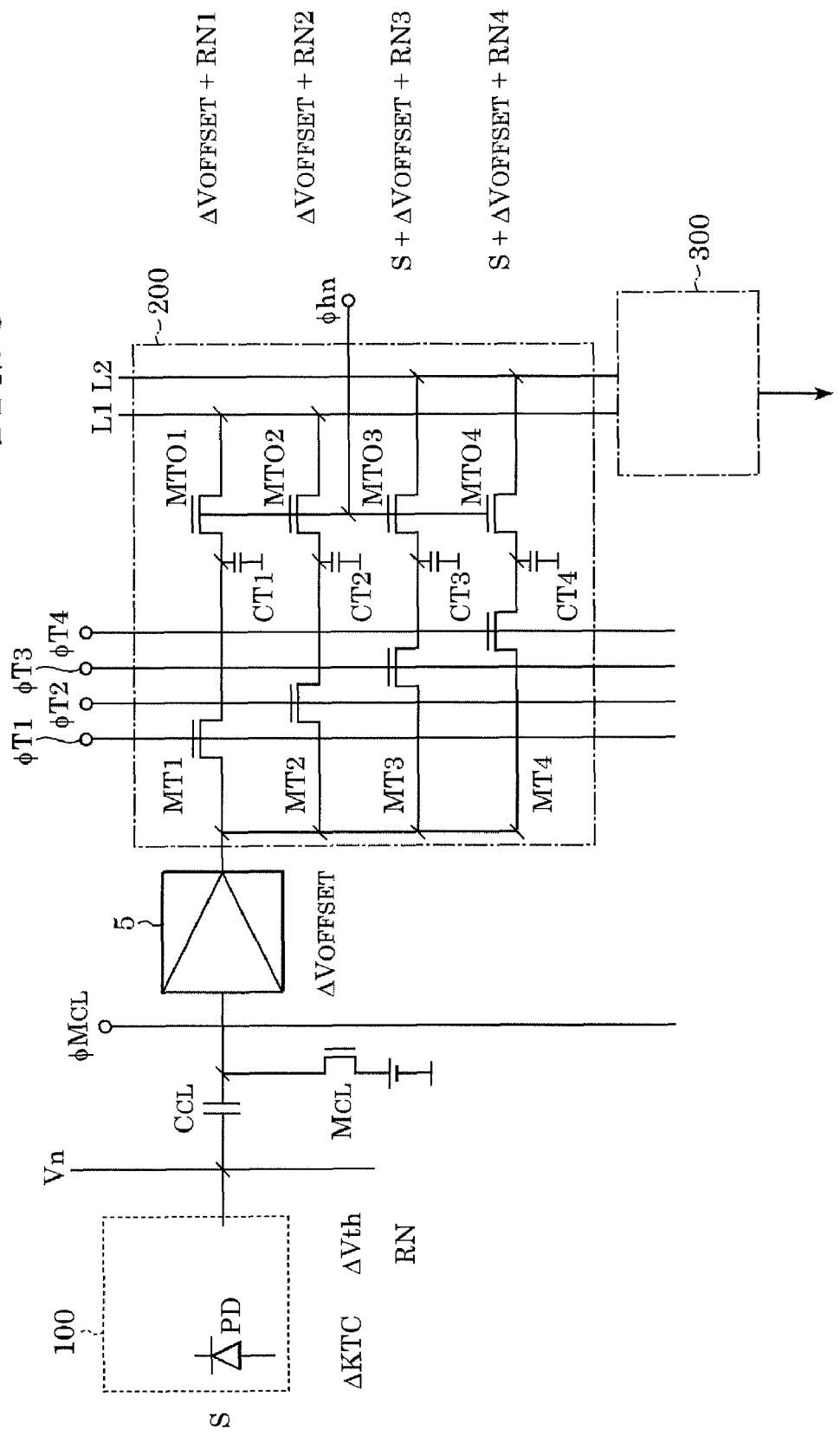
FIG. 3 shows a second embodiment of the present invention, also showing the circuit configuration having a CDS circuit and an amplifier.

A second embodiment of the present invention is shown in FIG. 3.

Circuits in FIG. 3 having a configuration identical to that of FIG. 1 are designated with the same reference numerals, and accordingly, descriptions thereof are omitted. When compared to the first embodiment of FIG. 1, in the second embodiment, a CDS circuit (CcL, McL) for removing fixed pattern noise of the amplifying transistor and an amplifying circuit 5 are provided between the pixel unit block 100 and the temporary storage memory block 200. The CDS circuit enables ΔKTC noise of the clamping capacitor and noise of the amplifying transistor (ΔKTC+ΔVth) to be removed. Furthermore, the amplifier 5 makes it possible to obtain a signal level in such a degree that the noise of the circuit at the subsequent stage can be ignored. It is also possible for this amplifier 5 to switch the gain of the imaging device. During low illumination time, this is convenient for avoiding the influence of the noise of the subsequent stage circuit.

The CDS circuit is described next. A clamping capacitor Ccl for CDS is connected to a vertical signal line Vn, and a clamping transistor Mcl is connected to a desired reference power supply at the end of the clamping capacitor. Initially, when first pixel noise is read from the amplifying transistor, the electrical potential thereof is clamped to the reference power supply. For the noise and the signal which are read next, the variation components of the amplifying transistor, that is, RN noise and the variation voltage for light charge, are input to the amplifier. In the amplifier 5, the noise and the signal are amplified, the offset voltage of the amplifier is superposed thereon, and the result is stored in the temporary storage memory 200.

Figure 4:
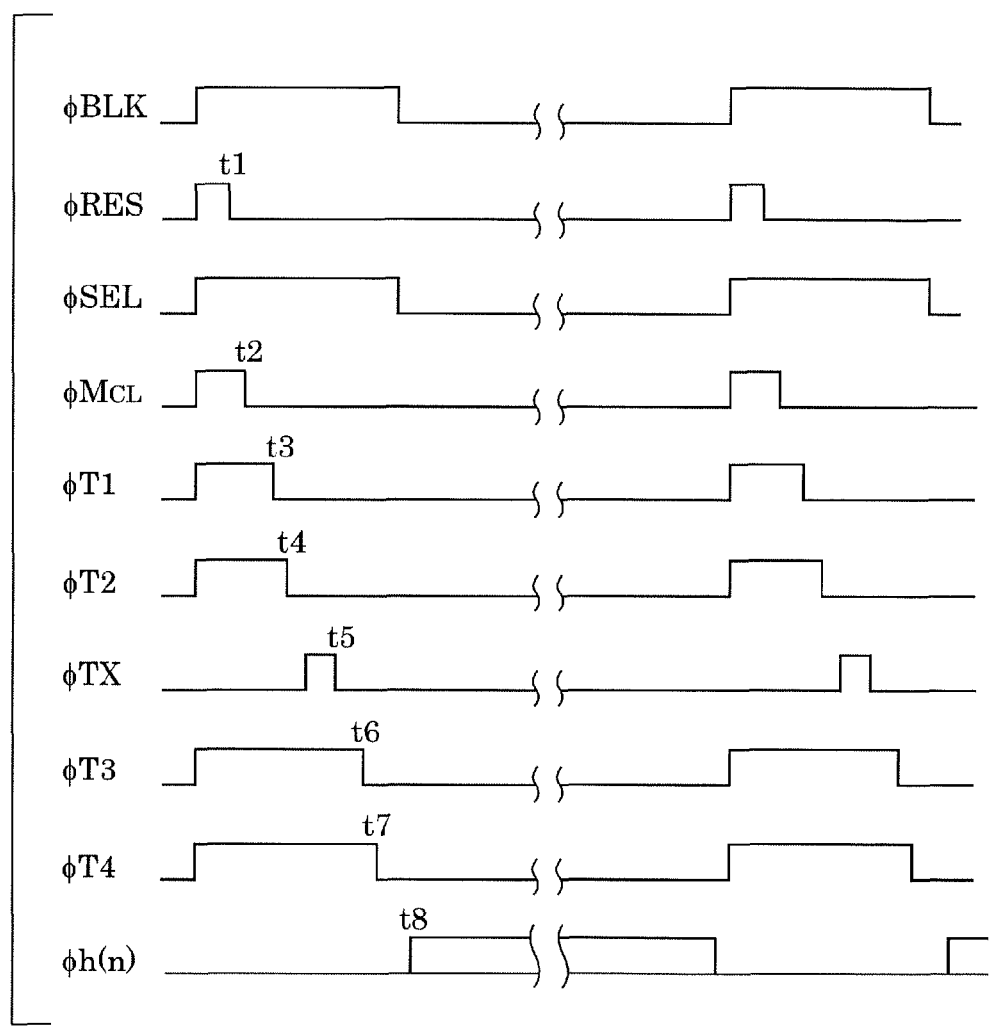
FIG. 4 is a timing chart of the second embodiment of the present invention.

FIG. 4 shows an operation timing chart of the second embodiment of the present invention.

When the input of the amplifying transistor is reset in accordance with the pulse ΦRES in the period t1 and the CDS circuit is made to operate in the period t2, the input end of the clamping capacitor is clamped to the noise electrical potential of the amplifying transistor, and the end thereof is clamped to the reference electrical potential. Next, in the period t3, the offset voltage and the noise of the amplifier are stored in the memory in accordance with the pulse ϕT1. Similarly, in the period t4, the offset voltage and the noise of the amplifier are stored in the memory in accordance with the pulse ϕT2. Also, during the signal reading, similarly, the photoelectric conversion signal S and the offset voltage and the noise of the amplifier are stored in the memory in the periods t5 and t6. The noise and the signal of the memory are simultaneously transferred to the horizontal signal lines L1 and L2 in accordance with the pulse ϕh (n) from the horizontal scanning circuit and become the noise (ΔVoffset+RN'√2) and the signal (S+ΔVoffset+RN"/√2), which are added and averaged. The offset noise (ΔVoffset) of the amplifier is removed by the differential process of the differential amplifier 300-1, and a signal Vout (S+RN) is output. In both the first and second embodiments, since the noise of the memory and the differential amplifier is omitted, the noise contained in the signal Vout is the same in the description.

Third Embodiment

Figure 10:
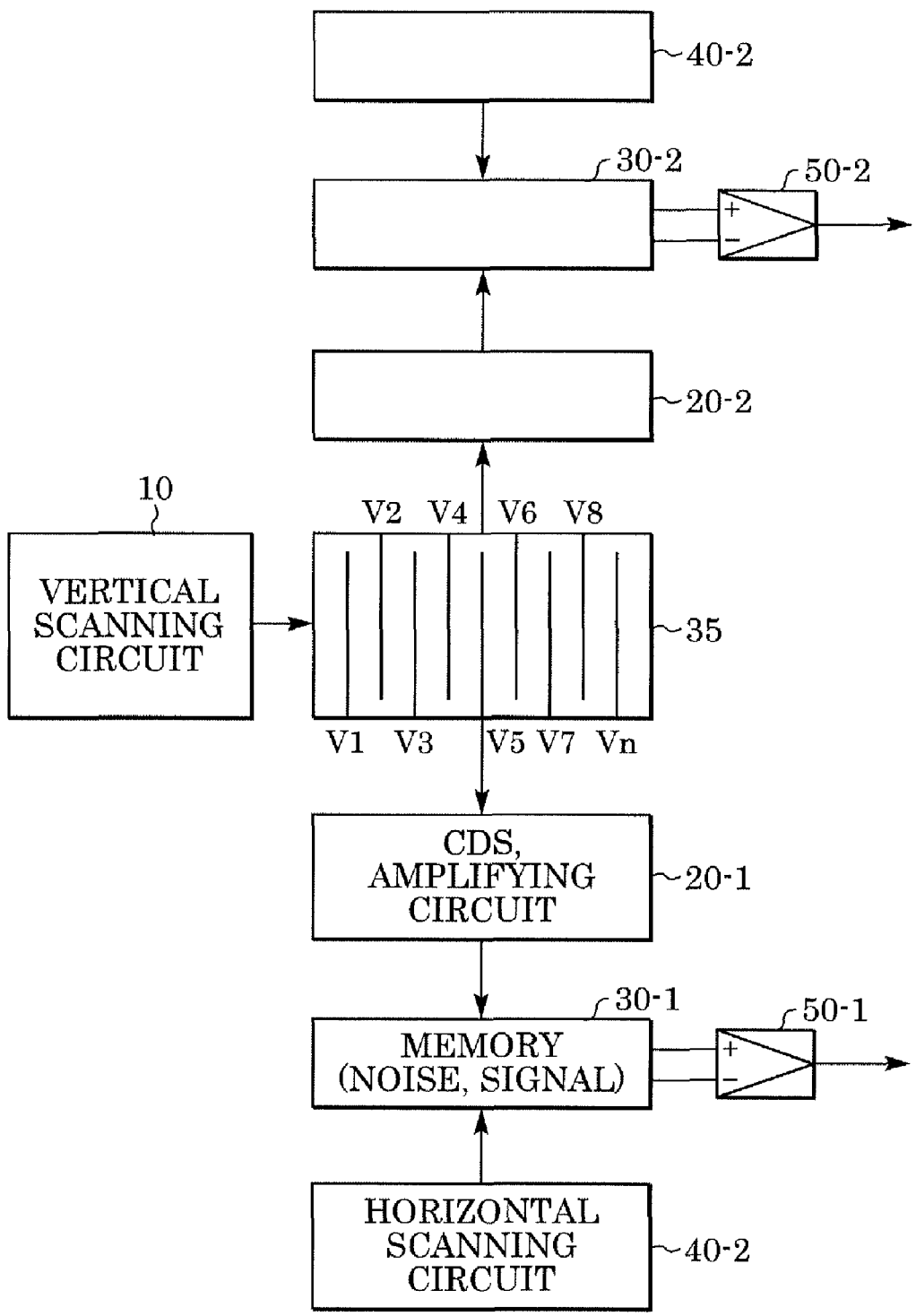
FIG. 10 shows the overall configuration diagram of an imaging device of the third embodiment of the present invention.

FIG. 10 shows a schematic view of the overall configuration of an imaging apparatus of a third embodiment of the present invention. In FIG. 10, a plurality of pixel units are formed in the horizontal and vertical directions in an image-capturing area 35. A microlense for improving the collection of light, a color filter for colorization, and the like, are formed in the pixel unit (not shown in the figure).

The pixel of each pixel row within the image-capturing area 35 is controlled by the vertical scanning circuit 10.

In FIG. 10, within the image-capturing area 35, only the vertical signal lines V1 to Vn are shown schematically. The vertical signal lines are connected to a corresponding CDS and amplifying circuits 20-1 and 20-2 in the odd-numbered columns and the even-numbered columns, respectively, and the output signals are temporarily stored in the memories 30-1 and 30-2. Then, the noise and the signal of the memories are guided to the differential amplifiers 50-1 and 50-2 in accordance with the control pulse of the horizontal scanning circuits 40-1 and 40-2, and the noise is reduced.

In FIG. 10, the CDS amplifying circuits 20-1, 20-2 correspond to CcL and McL in FIG. 3. Furthermore, the CDS amplifying circuits 20-1, 20-2 correspond to the amplifying circuit 5 in FIG. 3. The memories 30-1, 30-2 correspond to the temporary storage memory 200 in FIG. 3. The differential amplifiers 50-1 and 50-2 correspond to the difference circuit 300 in FIG. 3.

Thus, the composition and operation of the third embodiment (shown in FIG. 10) are the same as those of the second embodiment (shown in FIG. 3) except for reading to the bottom in the even-numbered columns and reading to the bottom in an odd-numbered columns in the third embodiment (FIG. 10).

Fourth Embodiment

Figure 5:
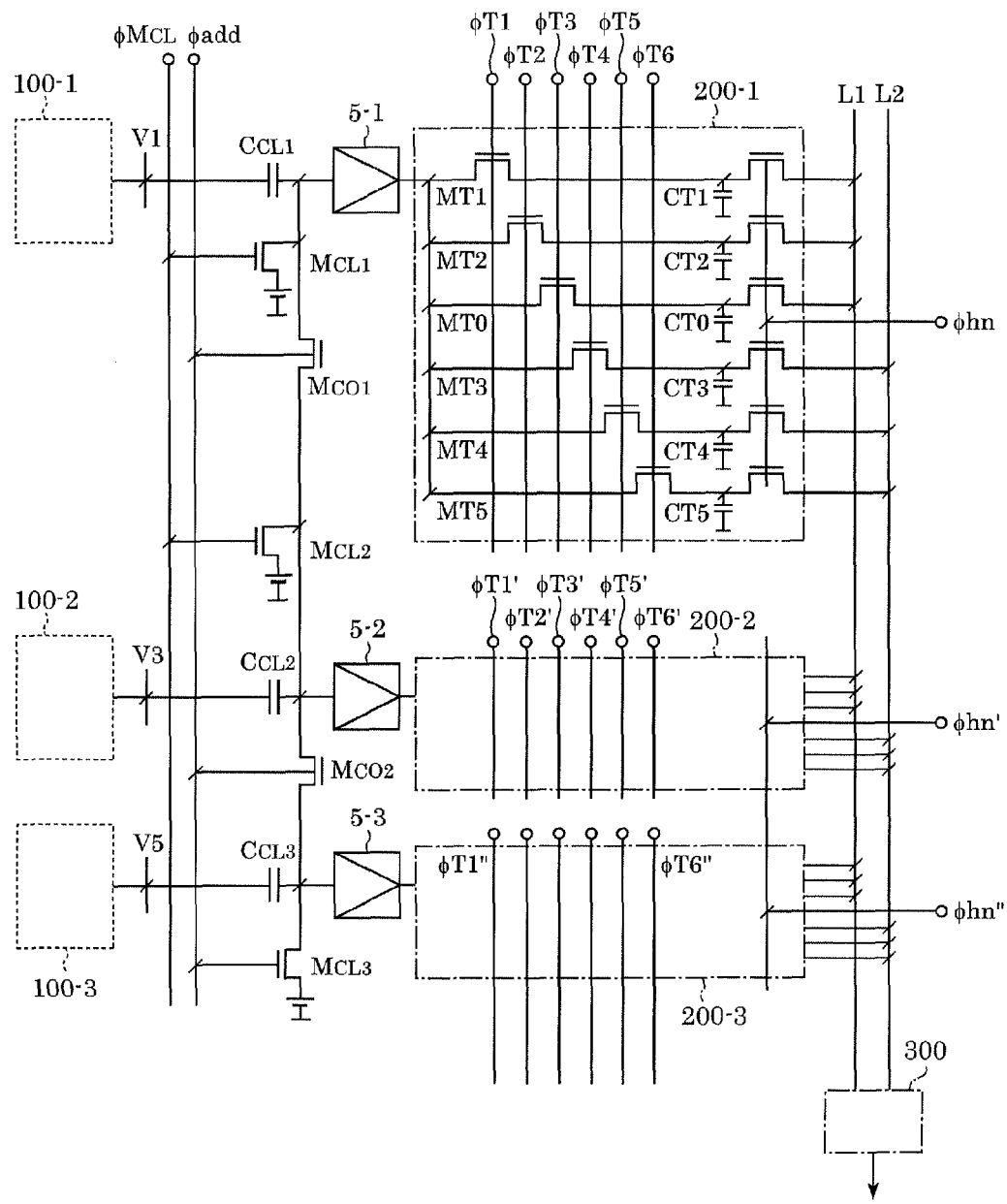
FIG. 5 shows a fourth embodiment of the present invention, also showing an example in which an addition circuit for a plurality of pixel signals and a circuit for plural readings are used in combination.
Figure 6:
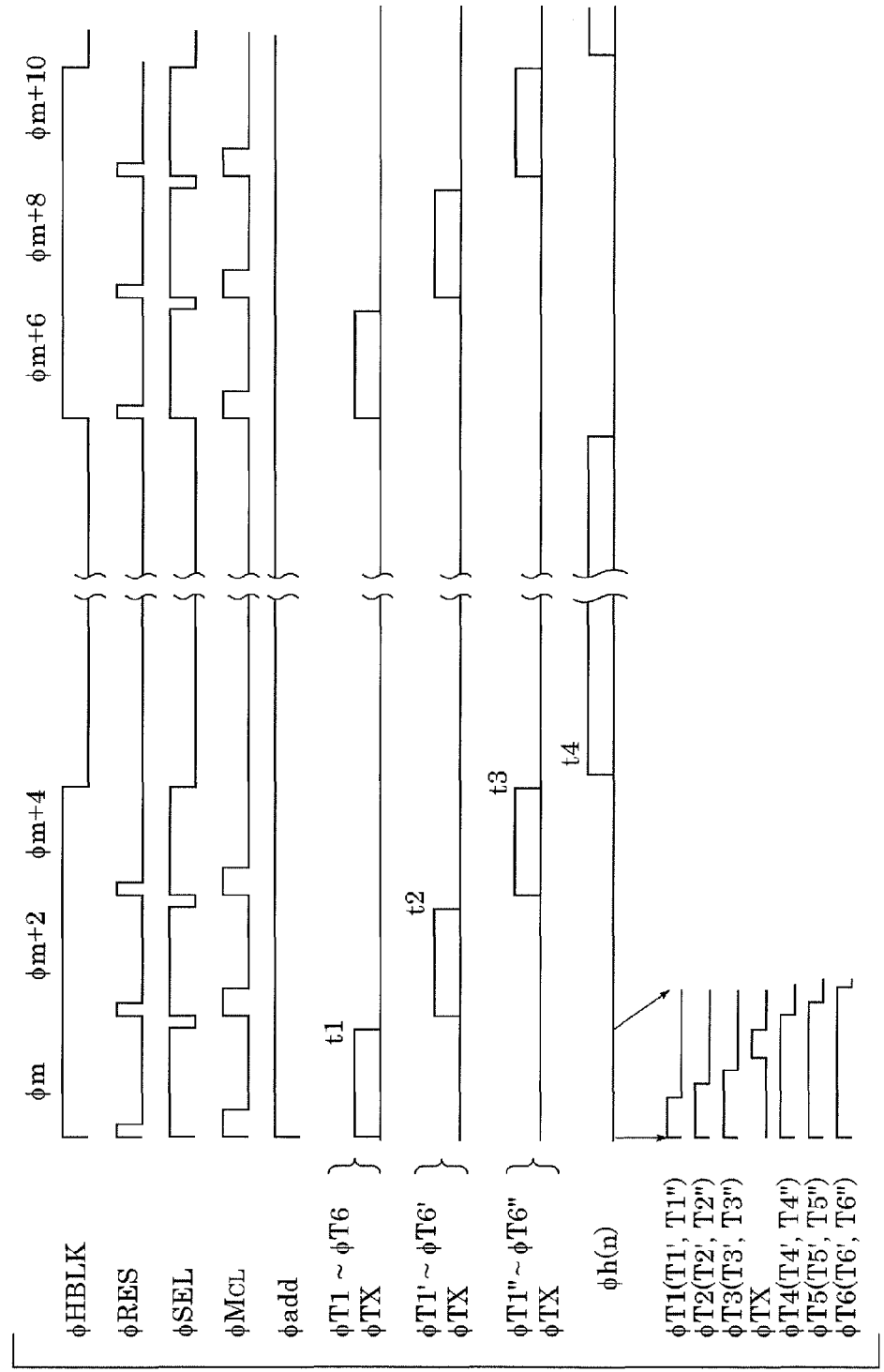
FIG. 6 is a timing chart of the fourth embodiment of the present invention.

A fourth embodiment explains the composition and operation of the imaging device in a case of 3×3 pixels. FIG. 5 is a circuit configuration in which addition averaging of the pixel signals of three pixels and three readings of noise and a signal are used in combination. FIG. 6 is a driving timing chart of the fourth embodiment of the present invention.

In this embodiment, as shown in FIGS. 15B-15E, addition averaging of a plurality of 3×3 pixels is performed. First, terminals after the CDS of pixel units 100-1 to 100-3 of the pixel row m are connected by transistors Mco1 and Mco2, and during addition, the conduction of this transistor is controlled in accordance with a pulse ϕadd. The noise and the signal after the CDS from the three pixel units are added and averaged in accordance with pulses (ϕT1 to ϕT6, and ϕTX) in the period t1, and are stored in the memories CT0 to CT5 after passing through an amplifier 5-1. As a result, the noise and the signal are read three times and are stored in a memory 200'-1. Similarly, in the pixel row m+2, addition averaging of the noise and the signals of the three pixels, and plural readings thereof are performed in accordance with pulses (ϕT1' to ϕT6', and ϕTX') and are stored in a memory 200'-2. Also, in the pixel row m+4, addition averaging of the noise and the signal of three pixels, and plural readings thereof are performed in accordance with pulses (ϕT1" to ϕT6", and ϕTX") and are stored in a memory 200-3'.

As shown in FIG. 6, in the subsequent period t4, since the noise and the signals of the memories 200-1 to 200-3 are transferred to the horizontal signal line simultaneously (ϕhn, ϕhn', and ϕhn" are controlled in accordance with a common pulse), the noise and the signal for nine pixels are added and averaged for three times in the horizontal signal line. Therefore, the noise RN can be reduced to $1/(3\sqrt{3})$. The result is that, in the output of the differential amplifier 300, the noise RN becomes $\sqrt{2}/(3\sqrt{3})$. When compared to the case in which no addition of plural pixels is performed, the noise RN is reduced to $1/(3\sqrt{3})$, and thus, the sensitivity is improved by $1/\sqrt{2}$ times (i.e., by about 70%).

Figure 11:
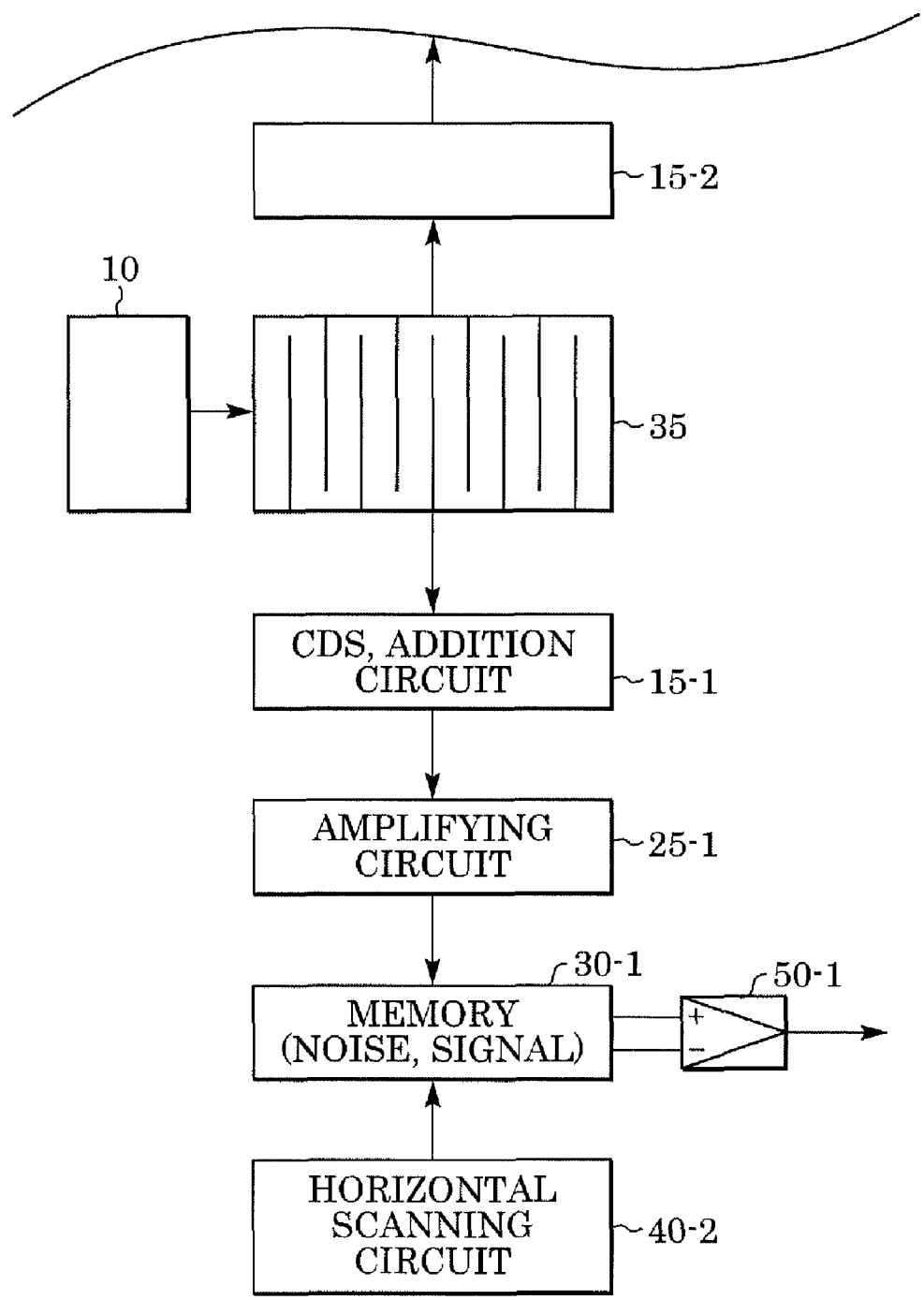
FIG. 11 shows the overall configuration diagram of an imaging device of the fourth embodiment of the present invention.

FIG. 11 is a circuit block diagram of an imaging device of the fourth embodiment of the present invention. The major difference between FIG. 11 and FIG. 10 is that in FIG. 11 an addition circuit (Mco1, Mco2) 15-1 is additionally provided, and an amplifying circuit 25-2 is formed at the subsequent stage.

Fifth Embodiment

Figure 7:
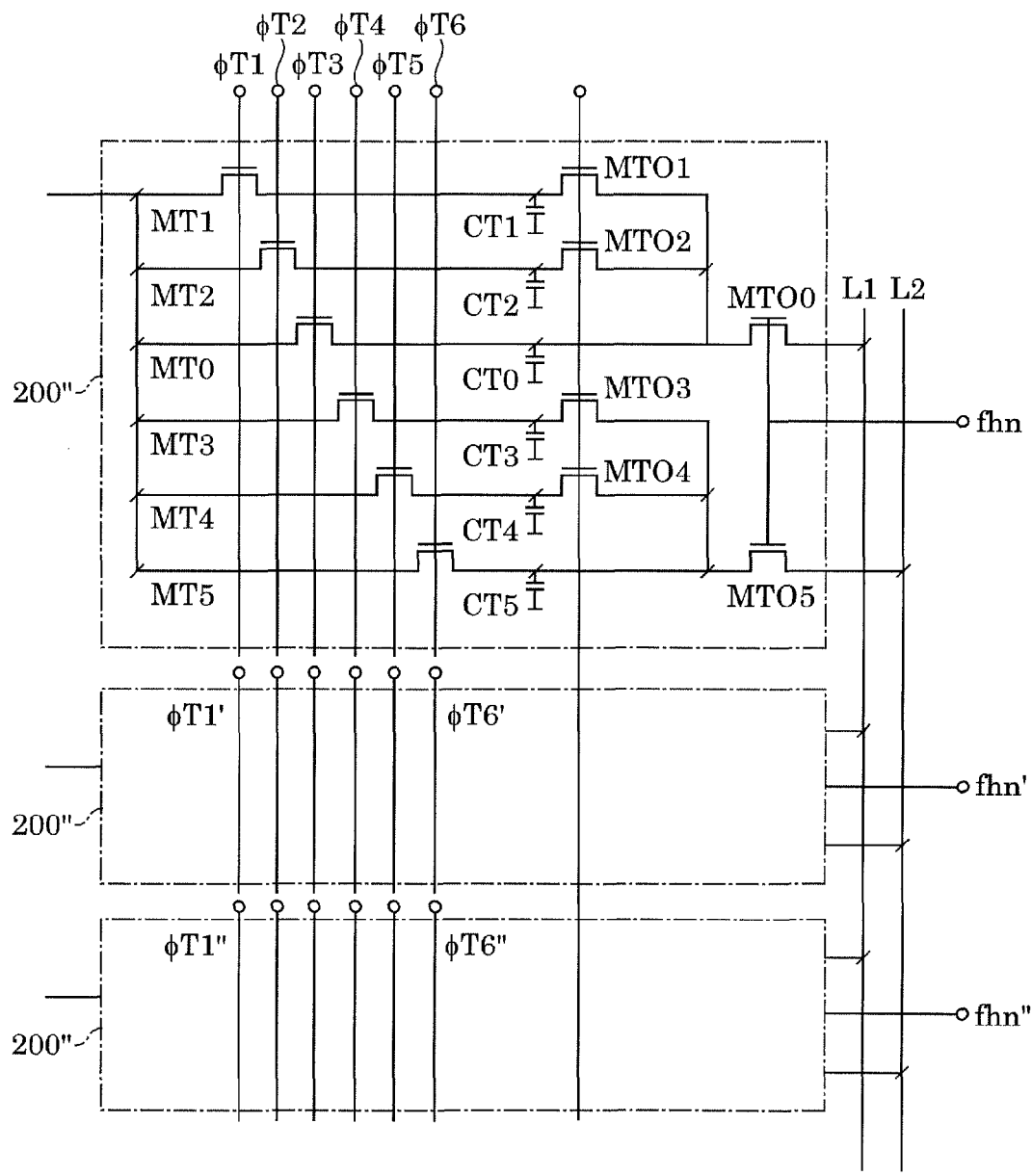
FIG. 7 is a configuration diagram in which the addition method after memorization is changed according to a fifth embodiment of the present invention.

When compared to the fourth embodiment, in the fifth embodiment, the addition after the storing capacitor CT (CT0-CT5) of the memory 200 is performed at a stage prior to transferring noise and a signal to the horizontal signal line (FIG. 7). The composition and operation other than the above is the same as a case of the fourth embodiment. As a result of such connection, the number of transistors connected to the horizontal signal line is reduced, the parasitic capacitance is reduced, and the transfer efficiency from the memory to the horizontal signal line by capacitance division can be improved.

Figure 8:
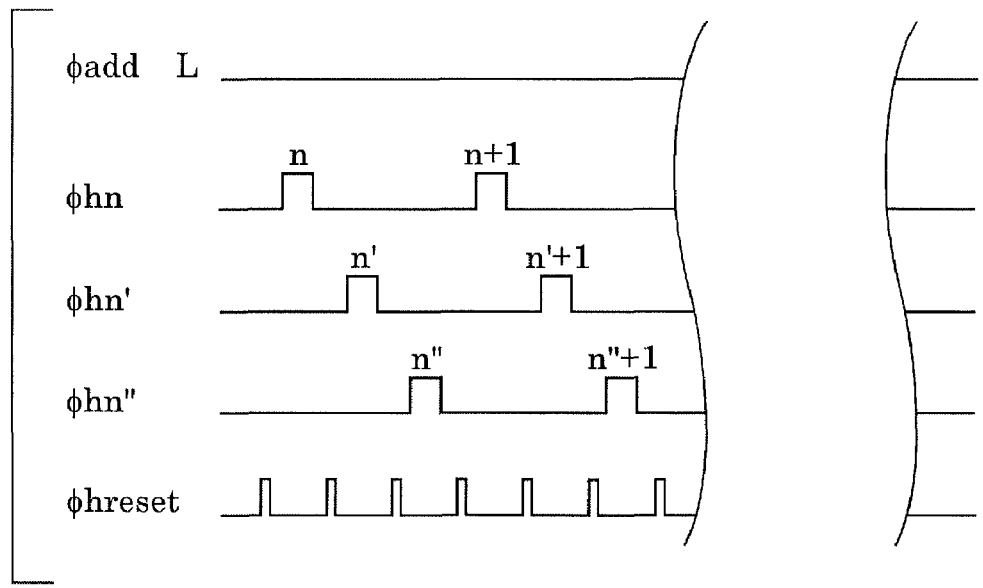
FIG. 8 is a timing chart during all-pixel signal reading.
Figure 9:
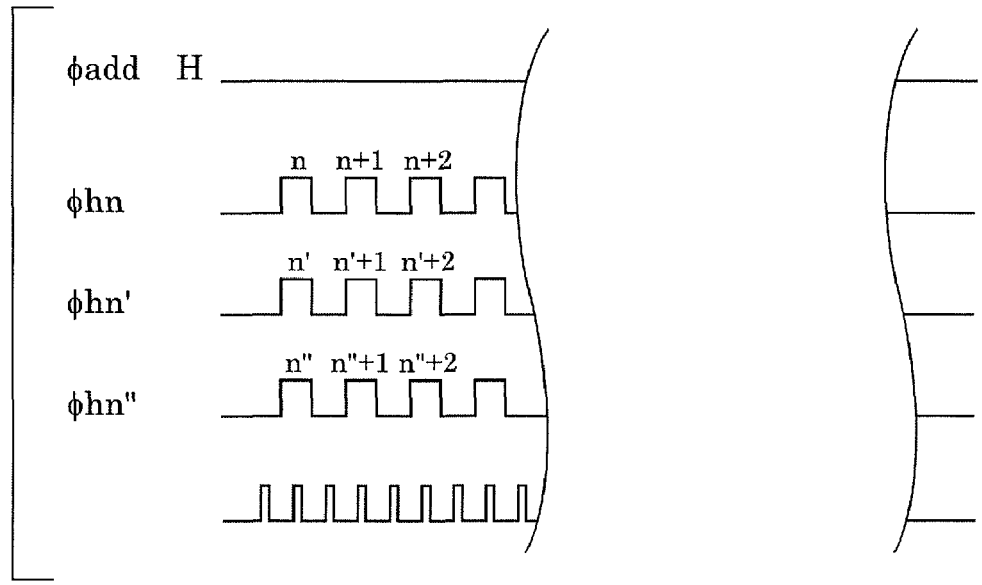
FIG. 9 is a timing chart during addition reading.

FIG. 8 is a timing chart in the case of all-pixel reading. FIG. 9 is a timing chart in the case of addition reading. In the all-pixel reading, the addition of plural pixel signals is turned on in accordance with an addition pulse Φadd, and horizontal transfer pulses φhn, φhn', and φhn" are controlled independently. In the addition reading, φhn, φhn', and φhn" are controlled in accordance with a common pulse.

Figure 12:
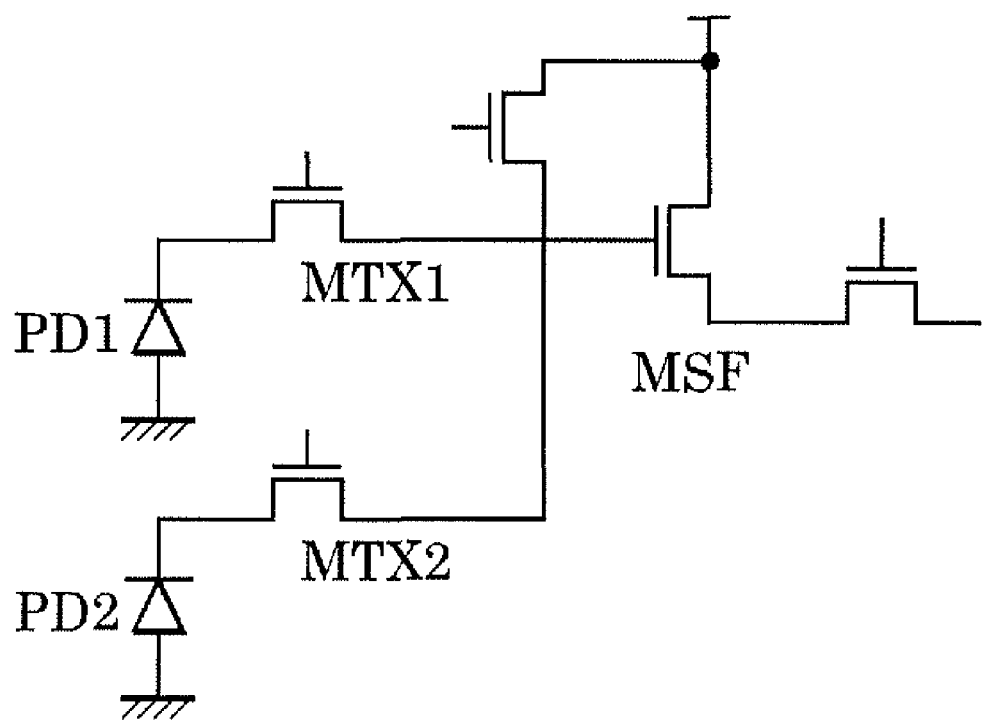
FIG. 12 is a diagram of an example of the configuration of a common amplifier pixel of a pixel section.

As for the pixel section of the image-capturing area, in the above-described embodiments, the configuration in which one amplifying transistor is formed with respect to one photodiode is described. As another embodiment of the pixel section, a common amplifier pixel configuration is shown in FIG. 12. This is an example in which two photodiodes are formed with respect to one amplifying transistor. If a plurality of photodiodes are arranged with respect to one amplifier, the area of the amplifying transistor with respect to one photodiode becomes smaller, with the result that there is the advantage that the aperture ratio of the photodiode is improved.

Figure 13:
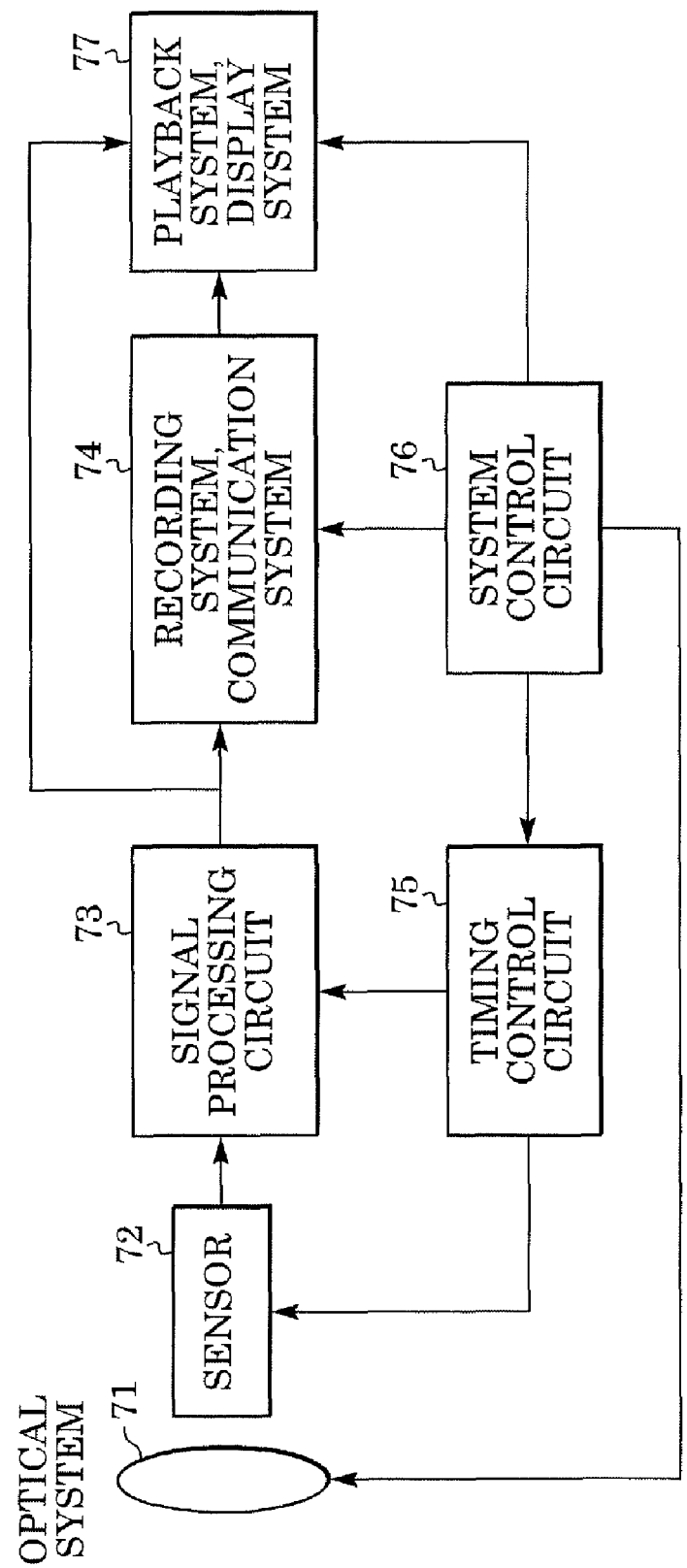
FIG. 13 shows an imaging apparatus.

FIG. 13 shows a schematic view of an imaging apparatus using the above-described imaging device. As shown in FIG. 13, subject light which enters through an optical system 71 is formed into an image on a sensor 72. The light information is converted into an electrical signal by the pixels arranged in the sensor. The electrical signal is subjected to a signal conversion process by a signal processing circuit 73 by using a predetermined method. The processed signal is recorded into or transmitted into an information recording device by a recording system/communication system 74. The recorded or transferred signal is played back or displayed in the playback system or in the display system. The sensor 72 and the signal processing circuit 73 are controlled by a timing control circuit 75. The timing control circuit 75, the recording system/communication system 74, and the playback system/display system 77 are controlled by a system control circuit 76. The timing control circuit 75 makes a selection of an all-pixel reading mode or an addition reading mode (as described in the fourth-fifth embodiments). The imaging device in the first embodiment through the fifth embodiment is driven by timing control circuit 75.

Between the all-pixel reading mode and the addition reading mode, horizontal and vertical driving pulses differ. Therefore, the driving timing of the sensor, the resolution process of the signal processing circuit, and the number of recording pixels of the recording system need to be changed for each reading mode. These controls are performed in accordance with each reading mode by the system control circuit. In the reading mode, the sensitivity differs as a result of the addition. With regard to this difference, aperture (not shown) control is performed by the system control circuit, and a switching is made to increase the gain of the amplifying circuit Amp of the sensor in accordance with the control pulse (not shown) from the timing control circuit, and thus a correct signal is obtained.

According to the imaging apparatus, in the high-precision image capturing, it is possible to perform all-pixel reading in order to achieve a higher sensitivity, and in the low resolution image-capturing, ultra-high sensitivity, high-speed reading, and high image quality are made possible.

According to the first to fifth embodiments described above, 1/f noise of the amplifying transistor can be reduced by reading plural times the noise and the signal from the pixel and by adding and averaging them. Since the addition of pixel signals and plural readings are used in combination, 1/f noise can be further reduced, and higher sensitivity is achieved. Since the centers of gravities of the spatial sampling of each color signal are made to match each other, moire fringing can be reduced. As a result of adding the pixel signals, the sensitivity can be improved, and high-speed reading and low power consumption become possible. Since the addition circuit can be formed small, imaging devices can be provided at a low price.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An imaging apparatus comprising:

at least one pixel unit having a photoelectric conversion section, an amplifying transistor for amplifying a signal from the photoelectric conversion section, a reset transistor for resetting an input section of the amplifying transistor, and a transfer transistor for transferring a signal generated at the photoelectric conversion section to the input section of the amplifying transistor, the amplifying transistor outputting a signal of a first signal type in a condition which the input section of the amplifying transistor is reset and outputting a signal of a second signal type that is amplified from the signal, transferred by the transfer transistor, from the photoelectric conversion section;

at least one storage unit having a plurality of storage sections and a sampling device, each storage section storing one signal of the first signal type or one signal of the second signal type, and having a first mode in which at least two signals of the first signal type obtained at different times are stored in at least two of the storage sections and a second mode in which at least two signals of the second signal type obtained at different times are stored in at least two of the storage sections;

at least one mixing unit for generating a first mixing signal by mixing the at least two signals of the first signal type stored in the first mode, outputting the first mixing signal, generating a second mixing signal by mixing the at least two signals of the second signal type stored in the second mode, and outputting the second mixing signal; and at least one difference processing unit for performing difference processing between the first mixing signal and the second mixing signal, wherein, after a level of a pulse applied to the reset transistor becomes low and before the level of the pulse becomes high, signals of the first type output from the amplifying transistor a plurality of times are sampled and held by the sampling device, after a level of a pulse applied to the transfer transistor becomes low and before the level of the pulse becomes high, signals of the second type output from the amplifying transistor a plurality of times are sampled and held by the sampling device, and the plurality of signals of the first and second type are added by the at least one mixing unit.

* * * * *